3,230,688
FLUID CONTROL METHOD AND APPARATUS
Leland G. Kitchen and Joseph T. Karbosky, Bartlesville, Okla., assignors to Phillips Petroleum Company, a corporation of Delaware
Filed June 28, 1962, Ser. No. 205,996
13 Claims. (Cl. 55—20)

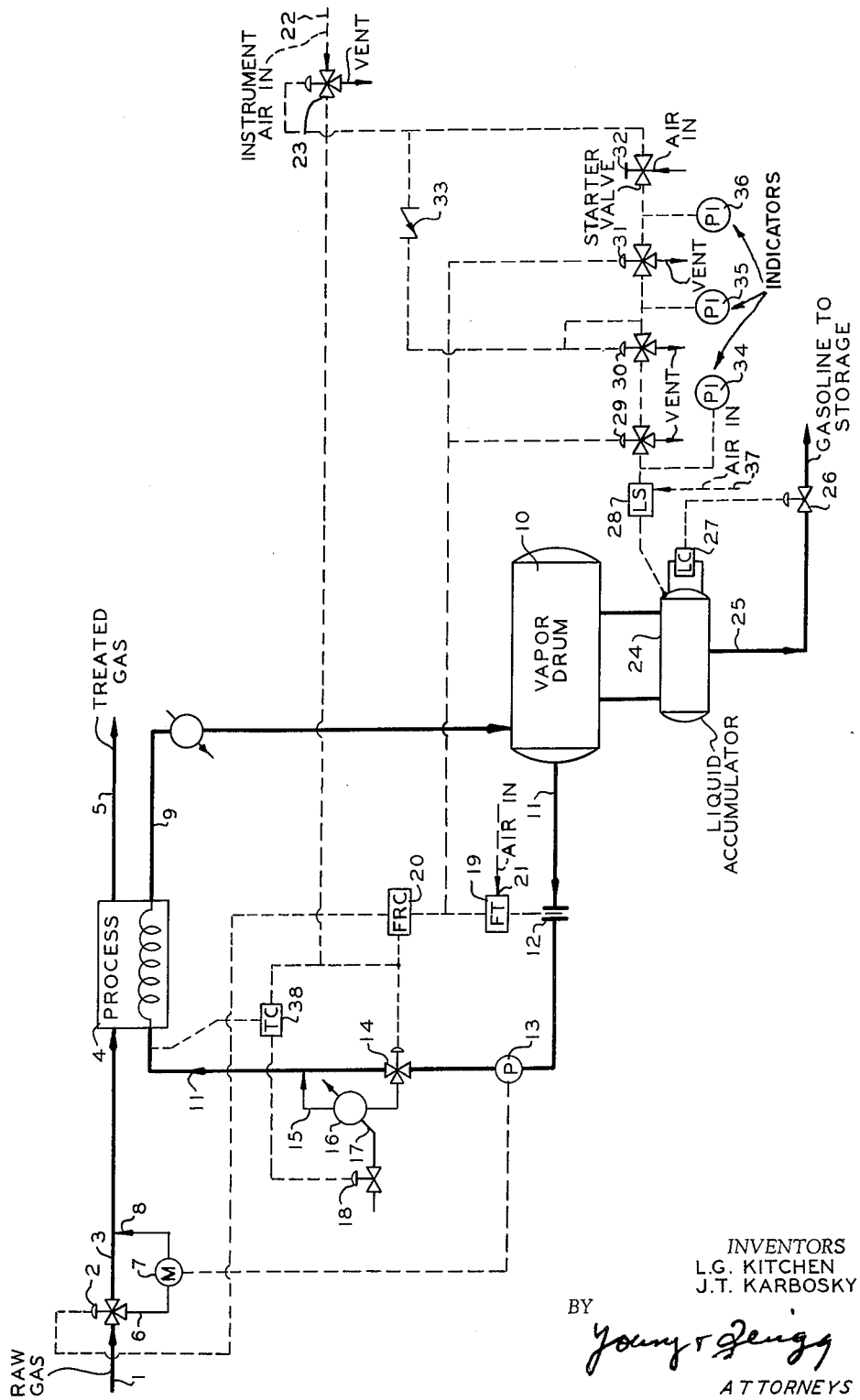

This invention relates to control of a fluid system. In one of its aspects, it relates to method and apparatus for by-passing the circulation of heated fluid in a process in response to an abnormal operational condition in said fluid, and for indicating the cause of by-passing by the combination of readings of a plurality of indicators. In another aspect, the invention relates to method and apparatus for shutting down a regeneration fluid system in an adsorption process in response to an abnormal condition of said regeneration fluid, and for indicating the cause of shut-down by the combination of readings of a plurality of indicators.

Many physical and chemical processes require as one of their steps the supplying of heat to the process. Heat can be conveniently supplied by a heated fluid stream which is either added directly to the process or passed in indirect heat exchange with it. However, when this heated fluid stream exhibits some abnormal characteristic which would be detrimental to the process, it becomes necessary to shut off this heat source in some manner. Further, when such a heat source has been shut off automatically, it is often difficult to determine what abnormal condition has effected the shut-down, thus making a re-starting of the process difficult or impossible until the abnormality can be corrected.

It is an object of our invention to provide method and apparatus for shutting down flow of a fluid heating stream in response to an abnormal condition of the stream, and to indicate what condition of the stream effects the shut-down. It is another object of our invention to provide method and apparatus for automatically stopping flow of heated regeneration fluid to an absorption process in response to an abnormal condition of the fluid, and for indicating the abnormality after the stopping.

Other aspects, objects, and the several advantages of the invention will become apparent to one skilled in the art upon study of this disclosure, the drawing, and the appended claims.

According to our invention, we have discovered method and apparatus for controlling flow of a fluid wherein the fluid passes to a valve zone and thence when the valve zone is in a first position to a fluid heating zone and when the valve zone is in a second position to a fluid heating by-pass zone which comprises measuring flow rate of the fluid, passing a motive force to the valve zone so as to maintain the valve zone in the first position, producing a signal proportional to the flow rate in response to the measuring, blocking the motive force so as to cause a first indicator zone to exhibit a first reading and a second indicator zone to exhibit a first reading and to cause the valve zone to move to the second position in response to the signal being above a first predetermined value, and blocking the motive force so as to cause the first indicator zone to exhibit a second reading and the second indicator zone to indicate a first reading and to cause the valve zone to move to the second position in response to the signal being below a second predetermined value, whereby the valve zone effects by-passing of the heating zone by the fluid when the flow rate is outside the range defined by the first and second predetermined values and whereby the readings of the first and second indicator zones indicate the cause of the by-passing.

In the drawing, there is represented a presently-preferred embodiment of our invention as applied to an adsorption process wherein a pneumatically-actuated shut-down and indicator control system is used.

Referring now to the drawing, there is shown a source of raw gas entering the system by way of conduit 1, three-way valve 2, and conduit 3 to process 4. In process 4, the gas is subjected to adsorption in order to remove natural gas liquids, and the gas is passed from the process after removal of these components by way of conduit 5 to further utility. The raw gas is normally apportioned by valve 2 between conduits 3 and 6; gas flowing through the latter conduit drives fluid motor 7 and then is passed by way of conduit 8 to be mixed with gas in conduit 3 as feed for process 4. This adsorption process produces natural gas liquids by regeneration of the adsorbent with a hot vapor; the resulting mixture of regeneration fluid and raw gasoline is passed by way of conduit 9 to a vapor drum 10. A portion of the vapors in drum 10 are withdrawn by way of conduit 11 to be returned to the process as regeneration fluid after suitable heating. The flow rate of this vapor is measured, for example, by orifice 12 and they are pumped through the regeneration circuit by a pump 13, preferably driven by fluid motor 7. Three-way valve 14 in conduit 11 is normally positioned to pass all the vapors from pump 13 by way of conduit 15 and heater 16; when valve 14 is moved to its other position, heater 16 is by-passed. Heater 16 is provided with a suitable source of heat as in conduit 17; flow therethrough is controlled by valve 18. A flow transmitter 19 senses flow in conduit 11 by pressure drop across orifice 12 and passes a signal modulated proportional to flow rate as the input to flow recorder controller 20. Transmitter 19 modulates air received by way of conduit 21. The output of controller 20 serves to adjust valve 2 so as to proportion the flow of raw gas between motor 7 and by-pass 3. A second source of instrument air is passed by way of conduit 22 to three-way valve 23; this latter valve is normally positioned (with air pressure of above 10 p.s.i.g. on its diaphragm) to pass air to the diaphragms of valve 14 and as supply air to controllers 20 and 38. With less than 10 p.s.i.g. pressure on the diaphragm of valve 23, the valve switches to its second position whereby it vents the diaphragms of valve 14 and discontinues the air supply to controllers 20 and 38.

A portion of the vapors in drum 10 is condensed by suitable cooling, and the resulting raw gasoline flows by gravity into liquid accumulator 24. Product gasoline is withdrawn from this vessel by way of conduit 25, controlled by valve 26 in response to liquid level controller 27 so as to maintain a suitable liquid level. A high-level switch 28 senses above the normal liquid level of this vessel and transmits a signal of about 15 p.s.i.g. to one port of three-way valve 29; when the level in vessel 24 rises to the sensing point, switch 28 transmits no signal to valve 29. A second port of valve 29 is connected serially to three-way valves 30 and 31 as shown. The third or vented port of valve 30 is preferably supplied with an orifice. Valve 31 also has one port vented, and its third port is connected through hand starter on regulator valve 32 to the diaphragm motor of valve 23. The diaphragm motors of valves 30 and 23 are connected through a check valve 33 as shown, allowing flow only from the latter to the former. The motor of valve 30 is also connected to the conduit communicating between valves 30 and 31. The motors of valves 29 and 31 are connected to the modulated output signal from transmitter 19. Three pressure indicators 34, 35 and 36 are provided as shown.

Valve 29 is adjusted to connect switch 28 to valve 30 when there is less than 12 p.s.i.g. on its motor; pressure on its motor above this value switches it to connect valve 30 to vent. Valve 30 is adjusted to connect valves 29 and 31 when there is above 10 p.s.i.g. on its motor; pressure on its motor less than this value switches it to connect valve 31 to vent. Valve 31 is adjusted to connect valve 30 and starter 32 when there is above 6 p.s.i.g. on its motor; pressure on its motor less than this value switches it to connect starter valve 32 to vent. Flow transmitter 19 is adjusted to transmit a signal to controller 20 and the diaphragms of valves 29 and 31 of about 6-12 p.s.i.g. over the desired flow rate range; its output signal is accordingly less than 6 p.s.i.g. or greater than 12 p.s.i.g. when the flow rate in conduit 11 is less or greater than the desired range. Instrument air sources 21, 22 and 37 are above 15 p.s.i.g., preferably around 30 p.s.i.g.

Temperature controller 38 is operatively connected to line 11. Controller 38 receives instrument air from line 22 and transmits a pneumatic signal to valve 18 to control the flow of fuel gas through line 17 to maintain a constant temperature in line 11. When valve 23 is turned to vent, controller 38 will not receive any instrument air to transmit a pneumatic signal to valve 18 and valve 18 will close.

Operation of the system will now be described with reference to the drawing and Table I. During normal operation of the system, raw gas enters by way of conduit 1 and drives fluid motor 7 before being treated in process 4 for removal of its natural gas liquids content, for example by adsorption. Treated gas is removed for further use by way of conduit 5. The liquids removed are passed (usually in vapor form), along with the regenerating fluid, by way of conduit 9 to drum 10 wherein a portion is condensed by cooling. In the preferred form of our invention, superheated vapors of the removed liquid are used as the regeneration or desorbing fluid; accordingly, vapors are withdrawn from drum 10 by way of conduit 11 at a rate controlled by pump 13. Since the pump is driven by motor 7, the regeneration fluid rate is thus correlated to raw feed gas rate. The regeneration fluid is passed by valve 14 to heater 16 wherein it is superheated by heat exchange with fluid in conduit 17, and then passed by way of conduit 11 to the process. Product natural gas liquids are removed from vessel 24 by way of conduit 25 as they accumulate.

So long as flow through conduit 11 is within the preselected range, transmitter 19 passes a signal of 6-12 p.s.i.g. as input to controller 20 which adjusts valve 2 to further correlate the drive rate of motor 7. This same signal also passes to the diaphragms of valves 29 and 31, positioning these valves to connect switch 28 to valve 30 and valve 30 to starter valve 32 respectively. So long as the level in tank 24 is below its high level as sensed by switch 28, this switch transmits a 15 p.s.i.g. signal through valve 29 to valve 30. In order to put the system into operation, it is necessary to move starter valve 32 manually so air from the lower part passes to the motors of valves 23 and 30. When this is done pressure from switch 28 passes through valves 29, 30 and 31 and through valve 32 when it (valve 32) has been released to the motor of valve 23, causing it to connect air source 22 to valve 14 and controllers 20 and 38. Further, this same pressure signal passes to the motor of valve 30, "locking" it into position. Valves 14 and 18 are now oriented so as to cause the regeneration fluid to be superheated in heater 16. It is noted that pressure indicators 34, 35 and 36 will all indicate some pressure above zero indicating normal operation.

When for any reason the level in accumulator 24 rises unduly, switch 28 no longer transmits a signal, i.e., its output is 0 p.s.i.g. This lack of signal immediately turns valves 23 and 30. Valve 23 accordingly vents pressure from the motors of valve 14 and controller 38, effecting by-pass of heater 16 and shut-off of heat source 17. Valve 23 further vents the air supply to controller 20, causing valve 2 to switch to by-pass fluid motor 7, with raw gas passing directly through conduit 3. Since fluid motor 7 is stopped, regeneration fluid pump 13 also stops. The regeneration circuit has now been shut down, and raw gas passes through process 4 without being treated. The output of switch 28 being zero, gauge 34 will read zero. Valve 30 being turned to "vent" causes gauges 35 and 36 to read zero. All three gauges reading zero indicates shut-down of the system because of high level in liquid accumulator 24.

When for any reason the flow rate of regeneration vapor in conduit 11 becomes excessive, i.e., above the pre-set range of transmitter 19, this transmitter produces a signal of above 12 p.s.i.g. Such a signal does not effect a change of position of valve 31, but does switch valve 29 so as to connect valve 30 to vent. This venting immediately switches valve 23 to shut off air supply to valve 14 and controllers 20 and 38, thus shutting down the regeneration circuit as described in the preceding paragraph, and further immediately causes valve 30 to switch so as to connect valve 31 to the vented port of valve 30. Gauges 35 and 36, being connected to a vent, will now read zero; since level switch 28 is still transmitting a pressure output signal indicative of a normal level, gauge 34 will exhibit a positive reading, valve 29 blocking loss of this signal. This combination of gauge readings indicates a shut-down of the regeneration system because of high flow rate in conduit 11.

When for any reason the flow rate of regeneration vapor in conduit 11 drops below the pre-selected range of transmitter 19, this transmitter produces a signal below 6 p.s.i.g. Such a signal does not effect a change of position of valve 29, but does switch valve 31 so as to connect starter 32 to the vented port of valve 31. This venting immediately switches valve 23 to shut off air supply to valve 14 and controllers 20 and 38, thus shutting down the regeneration circuit as described above. Valves 31 and 33 block loss of pressure from the system including switch 28 and valves 29 and 30. Thus, gauges 34 and 35 will exhibit a positive reading, while gauge 36, being connected to vent, will read zero. This combination of gauge readings indicates a shut-down of the regeneration system because of low flow rate in conduit 11.

The following table summarizes various operating conditions of the system.

TABLE I

| | Operations That Occur When Conditions Become— | | | |
|---|---|---|---|---|
| | Normal | High Level, Tank 24 | High Flow, Conduit 11 | Low Flow, Conduit 11 |
| Valve 2 | To Motor 7 | To By-Pass 3 | To By-Pass 3 | To By-Pass 3. |
| Valve 14 | To Heater 16 | To By-Pass | To By-Pass | To By-Pass. |
| Valve 18 | Open | Closed | Closed | Closed. |
| Transmitter 19, Output Press. | 6-12 p.s.i.g. | 6-12 p.s.i.g. and then to less than 6 p.s.i.g. | 12-15 p.s.i.g. and then to less than 6 p.s.i.g. | 3-6 p.s.i.g. and then to less than 6 p.s.i.g. |
| Valve 23 | 14, 38 and 20 from 22 | 14, 38 and 20 to Vent | 14, 38 and 20 to Vent | 14, 38 and 20 to Vent. |
| Switch 28, Output Press. | 15 p.s.i.g. | 0 p.s.i.g. | 15 p.s.i.g. | 15 p.s.i.g. |
| Valve 29 | 28 to 30 | 28 to 30 | 30 to Vent and then 28-30 | 28 to 30. |
| Valve 30 | 29 to 31 | 31 to Vent | 31 to Vent | 31 to Vent. |
| Valve 31 | 30 to 32 | 30 to 32 and then vents | 30 to 32 and then vents | 32 to Vent. |
| Gauge 34 | Press | Zero | Press | Press. |
| Gauge 35 | Press | Zero | Zero | Press. |
| Gauge 36 | Press | Zero | Zero | Zero. |

The invention will now be further illustrated by the following specific example.

Example I

A plant for removal of gasoline and water from natural gas is constructed as shown in the drawing. There are three adsorbers, each 6 ft. in diameter by 15 ft. high and having a fill of 14 ft. height; the upper 7 feet of fill is silica gel and the lower 7 feet of fill is activated carbon. The silica gel is efficacious for removal of both gasoline and water from the natural gas, while the activated carbon removes primarily only gasoline; hence, the ratio of fill of these components will depend upon the concentration of water in the feed. This plant processes 75,000,000 standard cubic feet of natural gas per day, and produces as desorbate a net of 6,600 gallons per day of de-ethanized gasoline.

|  | Compositions | | | | | | | |
| --- | --- | --- | --- | --- | --- | --- | --- | --- |
|  | $CO_2$ | $C_1$ and $C_2$ | $C_3$ | $iC_4$ | $nC_4$ | $iC_5$ | $nC_5$ | $C_6+$ |
| Feed, mol percent | 28.20 | 71.19 | .26 | .05 | .09 | .04 | .04 | .13 |
| Production, gallons percent | | | 3.10 | 2.10 | 5.45 | 6.65 | 12.40 | 70.30 |

Regeneration of an adsorber yields about 300–350 gallons of liquid hydrocarbon per cycle. About 35–40 minutes are required to regenerate an adsorber. About 9–10 million cubic feet per day of 400–425° F. vapor is used for regeneration, which takes place at about 1000 p.s.i.g. The feed is saturated with water at ambient temperature, and the treated gas contains less than 7 pounds of water per million cubic feet of gas.

Although the adsorption system has been described in its presently preferred embodiment wherein a portion of the product liquid is heated for use as the regeneration fluid, it is obvious that an external fluid such as steam, air or nitrogen can be used to effect regeneration of the adsorbent through the circuit including conduits 9 and 11. In this latter instance, separation of product from regeneration fluid can be accomplished in vessels 10 or 24. Further, although the control system of the invention has been described as pneumatic as presently preferred, the system can be hydraulic or electric. In the latter instance, transmitter 19, controller 20, and switch 28 are commercially available instruments which produce a D.C. voltage as output. Sources 21, 22 and 37 are voltage supplies. Valves 2, 14, and 18 are actuated by such as a solenoid, while valves 23 and 29–31 are SPDT switches with the "vent" connections replaced by ground. Valve 33 becomes a rectifier, and gauges 29–31 become volt-meters. One presently preferred adsorption system is described and claimed in co-pending application Serial No. 172,173, filed February 12, 1962, and a system for switching such a cyclic adsorption process through the phases of its cycle is described and claimed in co-pending application Serial No. 194,572, filed May 15, 1962.

Reasonable variation and modification are possible within the scope of this disclosure, the drawing, and the appended claims to the invention, the essence of which is that there is provided method and apparatus for effecting shut-down of a heating fluid system and for indicating the cause of the shut-down, wherein a signal indicative of one of excessively high and low flow rate of regeneration fluid and excessive accumulation of regeneration fluid effects, upon its transmission to a control zone, the termination of supply of heat to said regeneration fluid and in a further embodiment the termination of circulation of said regeneration fluid.

We claim:
1. The method of controlling flow of a fluid wherein said fluid passes to a valve zone and thence when said valve zone is in a first position said fluid passes only to a fluid heating zone and when said valve zone is in a second position said fluid passes only to a fluid heating by-pass zone which comprises maintaining said valve zone in said first position by passing a motive force thereto, measuring flow rate of said fluid, producing a signal proportional to said flow rate in response to said measuring, in response to said signal being above a first predetermined value terminating said motive force so as to cause a first indicator zone to exhibit a first reading and a second indicator zone to exhibit a first reading and to cause said valve zone to move to said second position in response to said signal being below a second predetermined value terminating said motive force so as to cause said first indicator zone to exhibit a second reading and said second indicator zone to indicate a first reading and to cause said valve zone to move to said second position, whereby said valve zone effects by-passing of said heating zone by said fluid when said flow rate is outside the range defined by said first and second predetermined values and whereby the readings of said first and second indicator zones indicate the cause of said by-passing, and passing said fluid to said heating by-pass zone.

2. The method of claim 1 wherein said fluid is further passed to a liquid accumulation zone further comprising producing a second signal only when the liquid level in said liquid accumulation zone is below a predetermined portion thereof, and blocking said motive force so as to cause a third indicator zone to exhibit a first reading and to cause said valve zone to move to said second position in the absence of said second signal, whereby any one of the variables high liquid level and flow outside said range effects by-passing of said heating zone by said fluid and whereby the combination of readings of said first, second, and third indicator zones indicates the cause of said by-passing.

3. Apparatus for controlling flow of fluid comprising a fluid source, fluid heating means, first conduit means connecting said fluid source and said fluid heating means, a by-pass around said fluid heating means, second conduit means connecting said fluid heating means and said by-pass valve means in said first conduit means adapted to pass fluid to said fluid heating means when in a first position and to by-pass fluid around said fluid heating means when in a second position, means including a source of motive power adapted to place said valve means in said first position when connected thereto, means for measuring the flow rate of said fluid and for producing a signal proportional to said flow rate, first control means responsive to a preselected high value of said signal adapted to disconnect said source of motive power from said valve means and to effect first readings on a first and a second indicator means, and second control means responsive to a preselected low value of said signal adapted to disconnect said source of motive power from said valve means and to effect a second reading on one of the two of said indicator means.

4. Apparatus of claim 3 wherein said second conduit is further connected to a liquid-receiving vessel further having a liquid level sensing means on said vessel adapted to produce a second signal when the liquid level is below a predetermined point in said vessel, and third control means responsive to said second signal adapted to connect said source of motive power to said valve means and to effect a finite reading on a third indicator means.

5. Fluid adsorption control apparatus comprising a source of fluid containing an adsorbable component, an adsorption vessel, first conduit means connecting said source and said adsorption vessel, a supply of regeneration fluid, connecting conduit means connecting said supply and said vessel, heat supplying means in a by-pass conduit, valve means in said connecting conduit means and said by-pass conduit adapted to pass said regeneration fluid through said heat supplying means when in a first position and to by-pass said regeneration fluid around said heat supplying means when in a second position, means including a source of motive fluid connected to said valve means to apply force thereto to maintain said valve means in said first position when connected thereto and to allow said valve means to assume said second position when disconnected therefrom, means for measuring the flow rate of said regeneration fluid and for producing a signal proportional to said flow rate, first control means responsive to a predetermined high value of said signal adapted to disconnect said source of motive fluid from said valve means and to effect a first reading on each of a first and second indicator means, and second control means responsive to a predetermined low value of said signal adapted to disconnect said source of motive fluid from said valve means and to effect a second reading on one of said first and second indicator means.

6. Apparatus of claim 5 wherein a liquid level sensing means provided in said supply of regeneration fluid is adapted to produce a second signal when the liquid level is below a predetermined point in said supply, and third control means responsive to said second signal adapted to connect said source of motive fluid to said valve means and to change the reading of a third indicator means.

7. Apparatus of claim 6 further comprising a fluid motor in a by-pass conduit in said first conduit means, second valve means in said first conduit means adapted to pass fluid through said fluid motor when in a first position and to by-pass fluid around said fluid motor when in a second position, fluid pump means in said connecting conduit means driven by said fluid motor, and means responsive to said first, second, and third control means adapted to move said second valve means from its first position to its second position on occurrence of any one of presence of said predetermined high value, presence of said predetermined low value, and absence of said second signal.

8. The method for controlling flow of regeneration fluid in a process, wherein said regeneration fluid is heated prior to its use as such, which comprises heating said regeneration fluid, measuring the flow rate of said regeneration fluid, comparing the measured value with a predetermined desired flow value range, producing and transmitting a first signal when said measured value is greater than said range, producing and transmitting a second signal when said measured value is less than said range, terminating the heating of said regeneration fluid in response to either of said transmitted first and second signals, and indicating in an indicating zone which of said first and second signals has occurred upon occurrence of either of said signals.

9. The method of claim 8 wherein said regeneration fluid is passed to an accumulation zone prior to said heating further comprising producing and transmitting a third signal when the level of fluid in said accumulation zone exceeds a predetermined level, terminating the heating in response to occurrence of any of said first, second and third signals, and indicating in said indicating zone which of said first, second and third signals has occurred upon occurrence of any of said signals.

10. The method of claim 9 wherein there is additionally effected a termination of flow of said regeneration fluid in response to occurrence of any of said first, second and third signals.

11. The method of controlling flow of a fluid wherein said fluid passes to a valve zone and thence when said valve zone is in a first position to a fluid heating zone and when said valve zone is in a second position to a fluid heating by-pass zone which comprises further passing said fluid to a liquid accumulation zone, producing a signal only when the liquid level in said accumulation zone is below a predetermined level therein and interrupting said signal when the said liquid level is above a predetermined level, passing a motive force to said valve zone so as to maintain said valve zone in said first position, when said signal is interrupted blocking said motive force so as to cause an indicator zone to exhibit a reading and to cause said valve zone to move to said second position whereby said valve zone effects by-passing of said heating zone by said fluid and said indicator indicates the cause of said by-passing.

12. The method of controlling flow of a fluid wherein said fluid passes to a valve zone and thence when said valve zone is in a first position said fluid passes only to a fluid heating zone and when said valve zone is in a second position said fluid passes only to a fluid heating by-pass zone which comprises
 (1) maintaining a valve zone in said first position by passing a motive force thereto;
 (2) measuring flow rate of said fluid;
 (3) producing a signal proportional to said flow rate in response to said measuring;
 (4) terminating said motive force in response to said signal being above a first predetermined value so as to cause
  (a) a first indicator zone to exhibit a first reading;
  (b) a second indicator zone to exhibit a first reading;
  (c) said valve zone to move to said second position whereby said valve zone effects by-passing of said heating zone by said fluid when said flow rate is above a first predetermined value and whereby the readings of said first and second indicator zones indicate the cause of said by-passing;
 (5) and passing said fluid to said heating by-passing zone upon terminating said motive force.

13. The method of controlling flow of a fluid wherein said fluid passes to a valve zone and thence when said valve zone is in a first position said fluid passes only to a fluid heating zone and when said valve zone is in a second position said fluid passes only to a fluid heating by-pass zone which comprises:
 (1) maintaining a valve zone in said first position by passing a motive force thereto;
 (2) measuring flow rate of said fluid;
 (3) producing a signal proportional to said flow rate in response to said measuring;
 (4) terminating said motive force in response to said signal being below a first predetermined value so as to cause
  (a) a first indicator zone to exhibit a first reading;
  (b) a second indicator zone to exhibit a different reading from that of said first indicator zone;
  (c) said valve zone to move to said second position whereby said valve zone effects by-passing of said heating zone by said fluid when said flow rate is above a first predetermined value and whereby the readings of said first and second indicator zones indicate the cause of said by-passing;
 (5) and passing said fluid to said heating by-pass zone upon terminating said motive force.

(References on following page)

References Cited by the Examiner

UNITED STATES PATENTS

| | | | |
|---|---|---|---|
| 2,517,812 | 8/1950 | Wade. | |
| 2,616,514 | 11/1952 | Shobe | 55—165 |
| 2,739,664 | 3/1956 | Parks | 55—33 |
| 2,895,883 | 7/1959 | Hobson | 210—512 |
| 2,957,544 | 10/1960 | Baker | 55—62 |
| 2,992,976 | 7/1961 | Cottle | 55—21 |
| 2,995,203 | 8/1961 | Maurer | 55—74 |
| 3,012,630 | 12/1961 | Lamb et al. | 55—33 |
| 3,045,893 | 7/1962 | Young | 173—13 |
| 3,060,950 | 10/1962 | Higmans | 137—599.1 |
| 3,061,992 | 11/1962 | Russell | 55—31 |
| 3,109,722 | 11/1963 | Dow | 55—21 |

REUBEN FRIEDMAN, *Primary Examiner.*